(12) United States Patent
Seolas et al.

(10) Patent No.: US 9,418,170 B2
(45) Date of Patent: Aug. 16, 2016

(54) CREATING RULES FOR USE IN THIRD-PARTY TAG MANAGEMENT SYSTEMS

(71) Applicants: Robert K. Seolas, Alpine, UT (US); John Pestana, Orem, UT (US); Matthew T. Miller, Provo, UT (US); Alan Martin Feuerlein, Orem, UT (US)

(72) Inventors: Robert K. Seolas, Alpine, UT (US); John Pestana, Orem, UT (US); Matthew T. Miller, Provo, UT (US); Alan Martin Feuerlein, Orem, UT (US)

(73) Assignee: Observepoint, Inc., Provo, UT (US)

( * ) Notice: Subject to any disclaimer, the term of this patent is extended or adjusted under 35 U.S.C. 154(b) by 607 days.

(21) Appl. No.: 13/890,863

(22) Filed: May 9, 2013

(65) Prior Publication Data

US 2014/0280012 A1    Sep. 18, 2014

Related U.S. Application Data

(60) Provisional application No. 61/785,385, filed on Mar. 14, 2013.

(51) Int. Cl.
*G06F 17/30* (2006.01)
*G06Q 30/00* (2012.01)

(52) U.S. Cl.
CPC .... *G06F 17/30896* (2013.01); *G06F 17/30864* (2013.01); *G06Q 30/00* (2013.01)

(58) Field of Classification Search
USPC ........................................... 707/709
See application file for complete search history.

(56) References Cited

U.S. PATENT DOCUMENTS

| | | |
|---|---|---|
| 6,792,458 B1 | 9/2004 | Muret |
| 6,804,701 B2 | 10/2004 | Muret |
| 7,610,289 B2 | 10/2009 | Muret |
| 7,849,202 B2 | 12/2010 | Muret |
| 8,032,564 B2 | 10/2011 | Muret |
| 8,150,983 B2 | 4/2012 | Muret |
| 8,261,362 B2 | 9/2012 | Goodwin |
| 8,429,243 B1 | 4/2013 | Wang |
| 8,516,601 B2 | 8/2013 | Goodwin |
| 8,554,804 B2 | 10/2013 | Muret |
| 8,572,065 B2 * | 10/2013 | McDonald ........ G06F 17/30864 707/708 |
| 8,640,037 B2 | 1/2014 | Goodwin |
| 8,683,051 B2 | 3/2014 | Muret |
| 8,683,056 B2 | 3/2014 | Muret |
| 8,805,946 B1 | 8/2014 | Gommen |
| 8,843,827 B2 | 9/2014 | Koo |
| 8,904,278 B1 | 12/2014 | Anderson |
| 8,990,298 B1 | 3/2015 | Anderson |
| 8,996,986 B2 | 3/2015 | Manion |
| 8,997,081 B1 | 3/2015 | Manion |
| 9,003,552 B2 | 4/2015 | Goodwin |

(Continued)

OTHER PUBLICATIONS

International Search Report and Written Opinion, PCT/US2014/024931, Mailed Aug. 5, 2014.

*Primary Examiner* — Debbie Le
(74) *Attorney, Agent, or Firm* — Workman Nydegger

(57) ABSTRACT

Methods and system allow for creating rules for a tag management system. One or more implementations create rules for a tag management system can include crawling a page of a website. Additionally, one or more implementations identify the configuration of each of the tags implemented within the page. Further, one or implementations generate one or more rules that enable a tag management system to recreate the configuration of one or more tags implemented within the page. Further still, one or more implementations export the generated one or more rules to a tag management system.

23 Claims, 5 Drawing Sheets

(56) References Cited

U.S. PATENT DOCUMENTS

| | | |
|---|---|---|
| 9,081,789 B2 | 7/2015 | Anderson |
| 9,116,608 B2 | 8/2015 | Koo |
| 9,165,308 B2 | 10/2015 | Cook |
| 9,185,016 B2 | 11/2015 | Muret |
| 9,203,905 B1 | 12/2015 | Hong |
| 9,219,787 B1 | 12/2015 | Manion |
| 2008/0040473 A1* | 2/2008 | Larsson ............ G06F 17/30896 709/224 |
| 2008/0071774 A1 | 3/2008 | Gross |
| 2008/0114875 A1 | 5/2008 | Anastas |
| 2009/0125469 A1* | 5/2009 | McDonald ............ G06N 5/025 706/47 |
| 2009/0164884 A1* | 6/2009 | Watson ............... G06F 17/3089 715/234 |
| 2009/0287713 A1 | 11/2009 | Anderson |
| 2010/0268720 A1 | 10/2010 | Spivack |
| 2011/0185016 A1* | 7/2011 | Kandasamy ........... G06Q 30/02 709/203 |
| 2012/0072488 A1* | 3/2012 | Manion .................... G06F 8/61 709/203 |
| 2012/0078874 A1* | 3/2012 | Gonzalez .......... G06F 17/30864 707/709 |
| 2013/0290480 A1 | 10/2013 | Manion |
| 2013/0297775 A1 | 11/2013 | Hong |
| 2013/0297776 A1 | 11/2013 | Hong |
| 2013/0297777 A1 | 11/2013 | Hong |
| 2013/0297778 A1 | 11/2013 | Hong |
| 2013/0332817 A1* | 12/2013 | Seifert ............. G06F 17/30893 715/234 |
| 2014/0041048 A1 | 2/2014 | Goodwin |
| 2014/0089782 A1 | 3/2014 | Cook |
| 2014/0129540 A1* | 5/2014 | Riley ...................... G06F 17/30 707/709 |
| 2014/0137006 A1 | 5/2014 | Goodwin |
| 2014/0156738 A1 | 6/2014 | Muret |
| 2014/0208216 A1 | 7/2014 | Koo |
| 2015/0066587 A1 | 3/2015 | Gommen |
| 2015/0213282 A1 | 7/2015 | Goodwin |
| 2015/0295988 A1 | 10/2015 | Goodwin |
| 2016/0004673 A1 | 1/2016 | Cook |

\* cited by examiner

CREATING RULES FOR USE IN THIRD-PARTY TAG MANAGEMENT SYSTEMS

CROSS-REFERENCE TO RELATED APPLICATIONS

The present invention claims the benefit of priority to U.S. Provisional Patent Application No. 61/785,385, filed on 14 Mar. 2013, entitled "CREATING RULES FOR USE IN THIRD-PARTY TAG MANAGEMENT SYSTEMS," and the entire content of which is incorporated by reference herein.

BACKGROUND OF THE INVENTION

1. The Field of the Invention

The entire content of the aforementioned patent application is incorporated herein by reference.

2. The Relevant Technology

As the Internet and the accompanying Internet commerce have expanded, various website owners have sought to track a variety of data about individuals who visit their websites. In particular, website owners often wish to gather a variety of different analytic data about the visitors who view their webpage. In many cases, this analytic data can be used to determine things such as what advertisements to display to a visitor and what fees should be paid to various external advertisers.

One conventional method for generating analytic data on website visitors is through the use of tags. In at least one conventional form, a tag is a hidden element within a webpage that causes some action to occur on a webpage when it is fired. In particular, in at least one implementation, a tag is a piece of code that is placed within a webpage and allows a webpage owner to track information about the visitors who download and execute the particular piece of code. For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Once executed, a tag can gather information such as where the visitor came from (e.g., what webpage or search engine), what keywords were used to find the webpage, whether a particular advertisement directed a visitor to the page, and other related data. In many situations, a single webpage can comprise multiple tags from a variety of different parties. For example, a particular webpage may contain a Google Analytics tag, a Facebook tag, a page-counter Tag, a weather tag, and other similar tags.

In order for the analytic data gathered by tags to be complete, websites with a large number of pages must have tags on every single page. If a page is missing a particular tag, then analytic information associated with that particular tag will not be gathered for the page. Additionally, some tags may become outdated or may be deemed a security risk. In these cases, the tags must be removed from every individual page within the website. As the number of tags and the size of websites have increased, managing the tags contained within a website has become an unwieldy task.

One development to help with issues relating to the control of tags within websites has been the implementation of tag management systems. Tag management systems function by replacing the plurality of individual tags on a webpage with a single master tag. When a user loads the master tag, the tag management system identifies, using a set of rules, which of a plurality of individual tags should be allowed to run on the webpage. The tag management system then allows the identified tags to fire.

A properly implemented tag management system can provide the benefits of, among other things, only requiring a single tag to be implemented on each page of a website and providing a single interface through which all of the tags can be controlled. In practice, however, it can be difficult to implement a tag management system within a website that has previously placed tags within its pages. In particular, it can be difficult to determine what rules should be applied to each individual page within a website in order to ensure that a tag management system associates the correct tags with each individual page.

In many cases, different webpages within the same website will contain different tags. Additionally, some webpages may be missing particular tags or may contain tags that are not necessary. In order for a tag management system to properly function, specific rules relating to each webpage must be created that lay out exactly what tags should be allowed to run and under what conditions they should be ran.

Accordingly, there are a number of problems in the art relating to the creation of rules for a tag management system that can be addressed.

BRIEF SUMMARY OF THE INVENTION

Implementations of the present invention overcome one or more problems in the art with systems, methods and apparatus configured to automatically generate rules for a tag management system by analyzing a website and identifying the configuration of tags within the website. In particular, at least one implementation of the present invention crawls a website and identifies the configuration of tags within each page of the website. The identified configurations can then be used to generate rules for a tag management system. Additionally, in at least one implementation, the present invention identifies patterns of the tags implemented within the webpages. The identified patterns can then be used to generate rules for the tag management system.

For example, a method in accordance with at least one implementation of creating rules for a tag management system can include crawling a page of a website. The method can also include identifying the configuration of each of the tags implemented within the page. Additionally, the method can include generating one or more rules that enable a tag management system to recreate the configuration of one or more tags implemented within the page. Further, the method can include exporting the generated one or more rules to the tag management system.

In an additional or alternative implementation, a method for creating rules for a tag management system can include crawling each of the pages of a website. The method can also include identifying one or more tags implemented within each of the pages. Additionally, the method can include identifying one or more patterns of the tags implemented within the pages of the website. Furthermore, the method can include generating one or more rules that are configured to enable a tag management system to recreate the one or more identified patterns. Further still, the method can include exporting the generated one or more rules.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
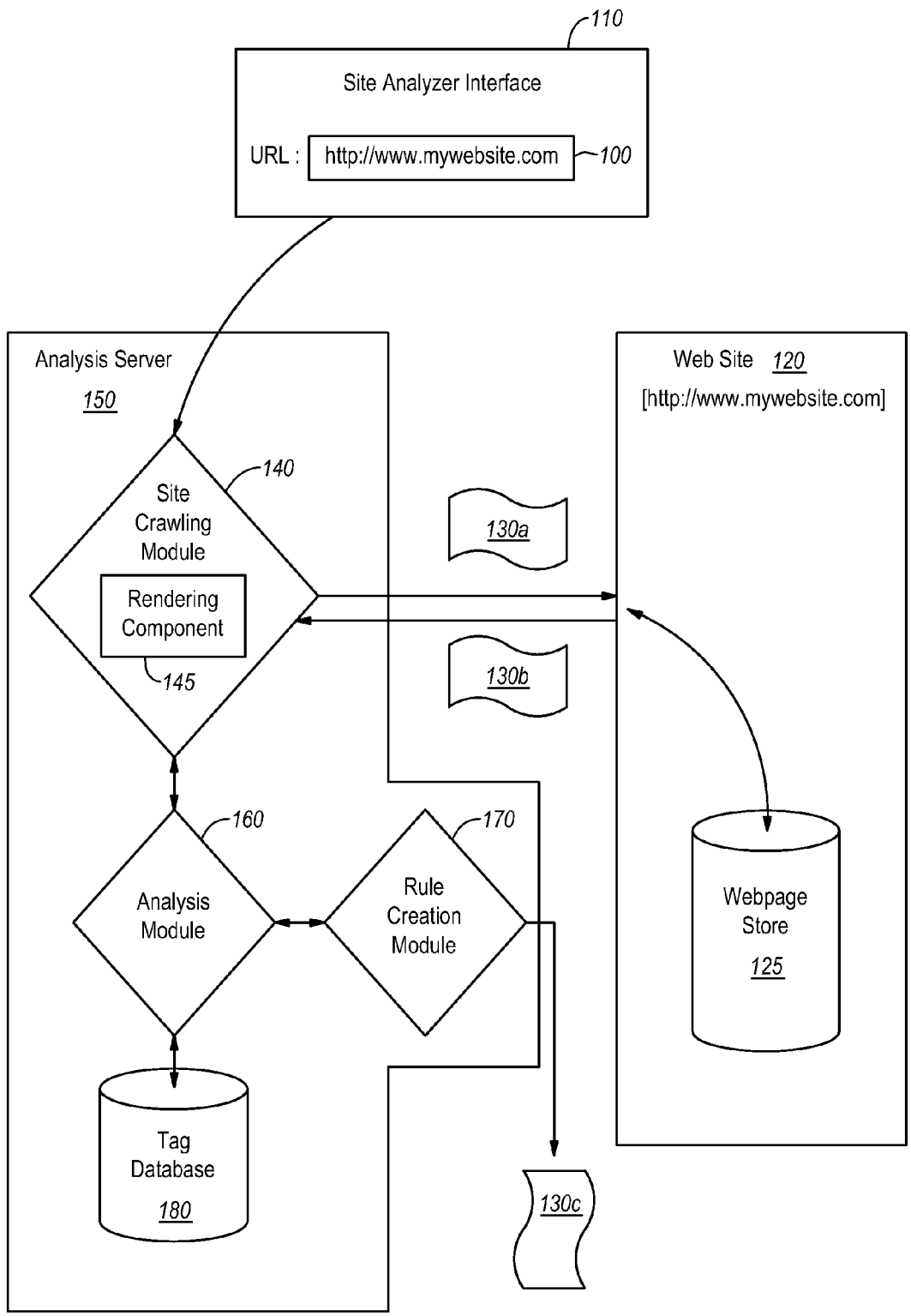
FIG. 1 illustrates an architectural schematic diagram of a system for creating rules for a tag management system.

Implementations of the present invention extend to systems, methods and apparatus configured to automatically generate rules for a tag management system by analyzing a website and identifying the configuration of tags within the website. In particular, at least one implementation of the present invention crawls a website and identifies the configuration of tags within each page of the website. The identified configurations can then be used to generate rules for a tag management system. Additionally, in at least one implementation, the present invention identifies patterns of the tags implemented within the webpages. The identified patterns can then be used to generate rules for the tag management system.

For example, at least one implementation of the present invention crawls an entire website and generates a set of rules for a tag management system. In particular, the system, software, and methods of the present invention can analyze each page of a website to identify the tags that are associated with each respective page. The present invention can then generate a set of rules that can be exported to a tag management system.

In at least one implementation, the present invention can also determine if a tag is associated with one or more variables. Upon determining that a tag is associated with a variable, in at least one implementation, the present invention can automatically generate a rule to properly handle the variable. In contrast, in at least one implementation, the present invention can prompt a user for additional information needed to properly generate a rule for the tag and variable.

Additionally, the present invention can identify tags that are embedded within rich content or multimedia content within a webpage. In particular, the present invention can render a webpage and activate multimedia content and rich content embedded in the webpage. As the webpage is rendering, the present invention can identify tags that fire. For example, tags can be associated with a video file, such that the tags fire only at specific points as the video file plays. This can enable a content provider to identify what portions of the video file have been viewed. In at least one implementation, the present invention can play a video file and identify the tags that fire as the video plays. The present invention can then generate rules that will enable a tag management system to properly implement the tags associated with the video file.

When analyzing the tags on various webpages of a website, the present invention can identify patterns in the tag placement and implementation within the website. For example, the present invention may identify that a particular tag is present on every page of a website. A resulting rule can be simplified to state that the particular tag should be present on every page. Similarly, the present invention may identify that a particular tag is present only within the shopping cart portion of a website. The resulting rule can simply state that whenever a shopping cart page is requested by a user the particular tag should be present on the page.

Accordingly, one will appreciate in view of the specification and claims herein that at least one implementation of the present invention analyzes a website and automatically generates rules for a tag management system. Specifically, at least one implementation of the present invention identifies the configuration of tags that are implemented within a webpage and creates rules that will enable a tag management system to replicate the current configuration of the tags within the website. One will understand that the automated generation of tag rules for a tag management system can result in a tremendous time and cost savings.

FIG. 1 illustrates an architectural schematic diagram of a system for creating rules for a tag management system. In particular, FIG. 1 shows a site analyzer interface 110 that is in communication with an analysis server 150. The analysis server 150 receives from the site analyzer interface 110 a URL 100 to be analyzed. The analysis server 150 comprises a site crawling module 140, an analysis module 160, a rule creation module 170, and a tag database 180.

The analysis server 150 can access the provided URL 100 and communicate with the website 120 that is associated with the URL 100. As depicted in FIG. 1, the website 120 can comprise a web page store 125, where the actual website content is stored. For example, a web page store 125 can store the source code of each webpage of a website 120. Additionally, a web page store 125 can store multimedia content that is accessible through the webpages.

In FIG. 1 and throughout the present application, website 120 is depicted and described as being a unitary system. One will understand, however, that a website 120 can be composed of multiple servers and multiple web page stores 125. In at least one implementation, the analysis server 150 can access the webpage stores 125 on each of the servers that is associated with a particular webpage.

FIG. 1 shows that a user can enter a URL 100 into a site analyzer interface 110. The site analyzer interface 110 can then communicate the URL 100 to the analysis server 150. In this application, a URL 100 of "http://www.mywebsite.com" is used for exemplary purposes, but one will understand that any number of different URLs 100 can be entered into the site analyzer interface 110.

Once the analysis server 150 has received the URL 100, the site crawling module 140 sends communication packets 130a to the website 120 that is associated with the URL 100 and receives response communication packets 130b from the website 120. In the depicted case, the site crawling module 140 accesses http://www.mywebsite.com. Specifically, the site crawling module 140 accesses the webpage store 125 that is associated with the website 120. In at least one implementation, the site crawling module 140 can then crawl, using methods that are known in the art, through the entire website 120 that is associated with URL 100.

In at least one implementation, the site crawling module 140 can include a rendering component 145. The rendering component 145 can render the information contained in the packets 130b that are received from the webpage store 125. For example, the rendering component 145 can render a java or flash portion of a webpage. Once rendered, the site crawling module 140 can crawl the rendered portion of the webpage and identify additional tags that where not otherwise visible.

In some cases, crawling a rendered webpage may provide additional information than what would be available if only the source code is crawled. In particular, a particular webpage may contain multimedia content that contains attributes of interest that are only visible when the multimedia content is activated. In at least one implementation, the rendering component 145 can enable the site crawling module 140 to access these attributes of interest by rendering and activating at least a portion of the content that is embedded within a webpage that is stored within the webpage store 125.

As the site crawling module 140 crawls a website 120, the data 130b that is received from the webpage store 125 can be sent to the analysis module 160. In at least one implementation, the site crawling module 140 communicates the received data 130b to the analysis module 160 on a webpage-by-webpage basis. Similarly, in at least one implementation, the site crawling module 140 communicates the data 130b to the analysis module 160 as the data is received. In another implementation, the site crawling module 140 communicates the data 130b to the analysis module 160 after it has crawled the entire website.

Further, the analysis module 160 and site crawling module 140 can have the capabilities to analyze multiple data streams or webpages in parallel. For example, the analysis module 160 and site crawling module 140 may comprise multiple processors, each of which is capable of independently analyzing or crawling a webpage. In at least one implementation, however, to avoid overstressing a website's 120 servers it may be desirable to limit the speed at which the site crawling module 140 crawls the website. To this end, the crawling module 140 may be configurable to access a website 120 only at specific time intervals so as to not negatively impact the servers of the website 120.

Once the analysis module 160 has received the data 130b from the site crawling module 140, the analysis module 160 analyzes the webpage 120 content to identify tags that are associated with each webpage of the website. Additionally, in at least one implementation, the analysis module 160 can determine the configurations of identified tags. For example in at least one implementation, the analysis module 160 can determine that specific variables are associated with a particular tag.

Additionally, in at least one implementation, the analysis module 160 receives rendered information from the rendering component of the site crawling module 140. The analysis module 160 can analyze the rendered information and identify tags that are associated with a particular webpage. In particular, in at least one implementation, the analysis module 160 can identify a tag as the tag is executed. For example, the analysis module 160 may identify that a particular piece of code requests information from either an unidentified server or from a server that is known to be associated with tag products.

Further, in at least one implementation, the analysis module 160 can identify tags that are associated with rich content or multimedia content. For example, in some multimedia files tags are configured to fire at particular points in the multimedia file, allowing the multimedia provider to identify how much of a particular file was viewed. In at least one implementation, the analysis module 160 can analyze the entire multimedia file and identify the tags and configurations of tags that are associated with the multimedia file.

Additionally, in at least one implementation, when analyzing a website 120, the analysis module 160 can also identify patterns in the tags that are associated with particular webpages. For example, in one exemplary case the analysis module 160 may identify that a particular tag is associated with all of the shopping cart webpages within a website 120. Similarly, in another exemplary case, the analysis module 160 may identify that a particular tag is present on every webpage, except pages that contain secure data.

In at least one implementation, the analysis module 160 identifies the tags that are associated with each webpage by referencing a tag database 180. In particular, the analysis module 160 can compare the source code of a particular website 120 to all of the known tags within the tag database 180. For example, the analysis module 160 may analyze a particular webpage that contains a Facebook tag. The analysis module 160 can compare the source code of the particular webpage to known tags that are contained within the tag database 180. The tag database 180 may contain a signature of the Facebook tag. Using the signature for the Facebook tag that is stored in the tag database 180, the analysis module 160 can identify that the particular webpage contains a Facebook tag.

In at least one implementation, the signatures within the tag database 180 may be actual copies of the known tags. In another implementation, the signatures may be based upon specific attributes of tags, such that the analysis module identifies a tag by identifying the specific attributes within a portion of the data 130b communicated from the site crawling module 140.

In at least one implementation, the tag database 180 is frequently updated to reflect the most recent tags that are available. Additionally, in at least one implementation, custom tags can be added to the tag database 180. For example, a web administrator may desire to have their website analyzed according to a method of the present invention. The administrator, however, may be aware of a custom tag that appears on at least a page of the website 120. In at least one implementation, the administrator can provide sufficient information that the custom tag can be added to the tag database 180. Once added to the database 180, the site crawling module 140 and analysis module 160 can proceed as described above and identify the tags associated with the page of the website 120, including the custom tag.

Additionally, in at least one implementation, the tag database 180 may also contain characteristics that are associated with each tag. For example, the data database may contain information about the variables, if any, that are commonly associated with specific tags. In addition, the tag database 180 may also contain information about past version of tags, such that the analysis module 160 can identify whether a particular tag is up-to-date. Further, in at least one implementation, the tag database 180 may contain information that enables the analysis module 160 to identify undesirable tags (e.g., tags that are deemed unsecure, tags that steal user information, etc.).

After identifying at least one tag, the analysis module 160 can communicate with the rule creation module 170. Specifically, in at least one implementation, the analysis module 160 communicates the tag identity, configuration, and associated webpage to the rule creation module 170. For example, the analysis module 160 may communicate to the rule creation module 170, that a Google Analytics tag is present on webpage "http://www.mywebsite.com/page1." Further, the analysis module 160 may communicate to the rule creation module 170 any variables that are associated with the tag.

In some implementations, tags associated with variables provide additional functionality than tags that are not associated with variables. For example, a tag associated with a variable may have the functionality to only fire on the first page of a particular user session. Similarly, a tag associated with a variable may be able to determine whether a website visitor originated from a particular advertising campaign. In at least one implementation, the variable that a tag is associated with may comprise a browser cookie. One will understand that associating variables with a tag can provide a website administrator with valuable data gathering tools.

In at least one implementation, the rule creation module 170 may not be able to create rules that fully characterize a particular tag. For example, a particular tag may rely upon variables that are external to the website 120 (e.g., a cookie). In this case, in at least one implementation, the rule creation module 170 can create an incomplete rule by placing the appropriate tag on the webpage but not fully characterizing the tag. A user may then have to go through the rules manually and finish characterizing the tag. In another implementation, the rule creation module 170 can notify a user that additional information is needed to fully characterize a particular tag. An interface can be provided to a user prompting the user to provide the additional information.

After receiving tag information from the analysis module 160, the rule creation module 170 can generate a rule that enables a tag management system to replicate the tag configuration of the website 120. Continuing the example from above, the rule creation module 170 can create a rule that associates the Google Analytics tag with "http://www.mywebsite.com/page1."

In at least one implementation, the rule creation module 170 creates rules on a page-by-page basis. For example, the rule creation module 170 can create the following rule to show that a particular webpage includes three tags, including the Google Analytics tag: "http://www.mywebsite.com/page1 includes Google Analytics tag, tag #2, tag#3". One will understand, however, that the above provided rule is merely exemplary and that a number of different rule formats can be used and still remain within the scope of the present invention.

In particular, in at least one implementation, the rule creation module 170 can be configured to export a rule file 130*c* in a format that is readable by a particular tag management system. For example, in a at least one implementation, a user can configure the rule creation module 170 to export a rule file in a format that is readable by the Google™ tag management system. Similarly, in at least one implementation, the rule creation module 170 is configurable to export the rule file 130*c* in a variety of formats that correspond to different commercial tag management system.

In contrast, in at least one implementation, the rule creation module 170 only generates rule files 130*c* in a single format that is proprietary to the present invention. In this embodiment, the various tag management systems may need to be configured to read the proprietary format. In either implementation, the rule creation module 170 is capable of generating a rule file 130*c* based upon information received from the analysis module 160.

Figure 2:
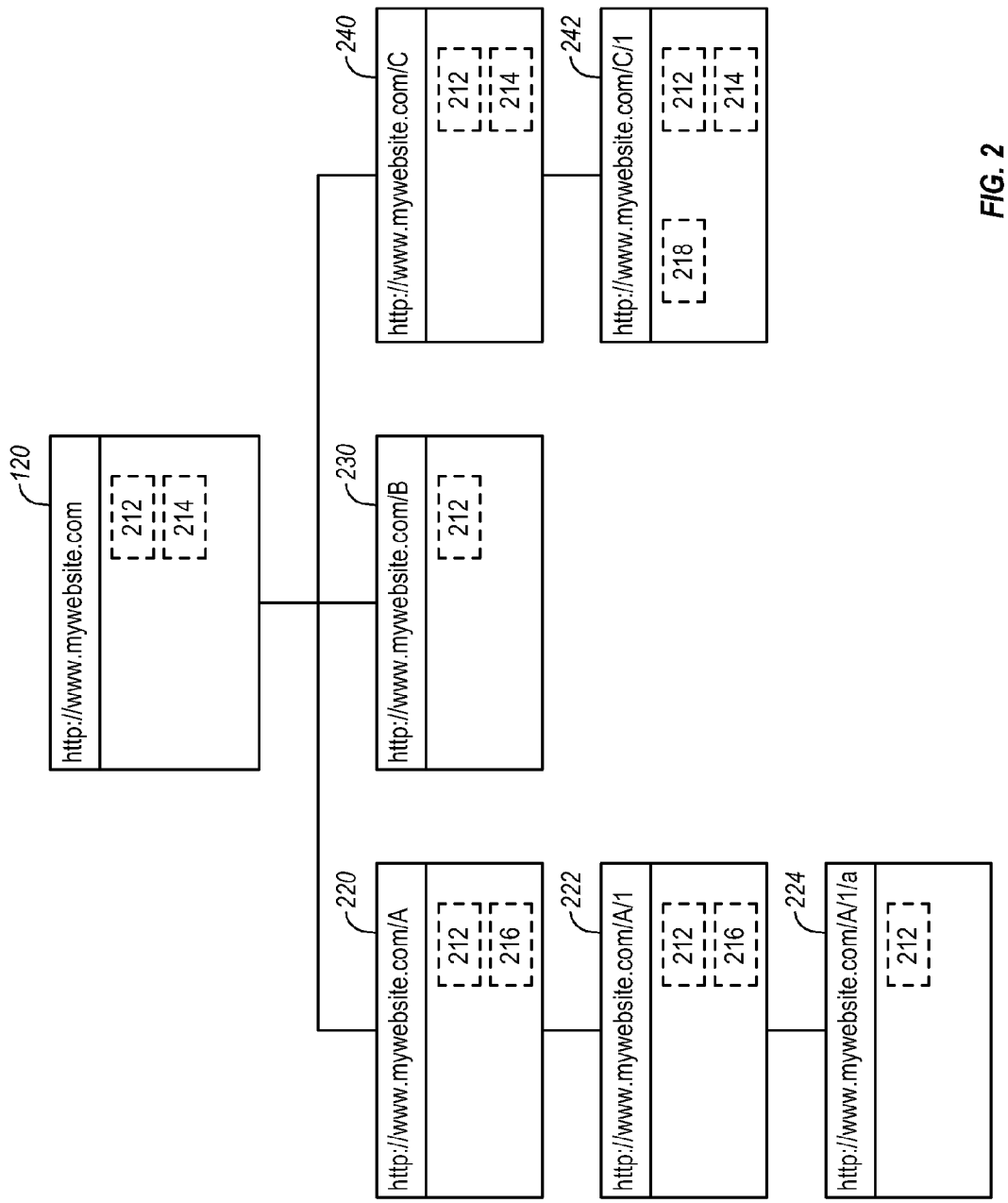
FIG. 2 illustrates a depiction of a website with multiple webpages containing tags and the relationship thereof.

FIG. 2 depicts of an exemplary website 120 with multiple webpages 220, 222, 224, 230, 240, 242 containing tags 212, 214, 216, 218. The illustration of the website in FIG. 2 shows the URL 100 of each individual webpage 120, 220, 222, 224, 230, 240, 242, along with the association of the webpages to each other. In addition, each webpage is depicted as containing one or more tags 212, 214, 216, 218. As illustrated in FIG. 2, the tags 212, 214, 216, 218 are depicted as dashed boxes. One will understand, however, that the boxes are depicted for the sake of clarity and that the actual tags are embedded within the source code of each webpage 120, 220, 222, 224, 230, 240, 242

Returning to the present invention, a user can enter the website URL 100, "www.mywebsite.com," into the site analyzer interface 110. Upon receiving the URL, the site crawling module 140 can begin to crawl the website 120 and identify each of the webpages 120, 220, 222, 224, 230, 240, 242 (note: website 120 "www.mywebsite.com" is associated with both the website 120 and the home page of the website 120) that are part of the website 120. As noted above, the site crawling module 140 may be configured to only access the website 120 at certain intervals to prevent the website 120 from being overloaded.

As the site crawling module 149 identifies the individual webpages 120, 220, 222, 224, 230, 240, 242 and communicates them to the analysis module 160, the analysis module 160 can begin identifying the tags 212, 214, 216, 218 and configuration of tags that are associated with each webpage 120, 220, 222, 224, 230, 240, 242. As mentioned above, information about the identify and characteristics of tags 212, 216, and 218 can be stored within the tag database 180, such that the analysis module 160 can identify each tag 212, 214, 216, 218 based upon the stored information.

For example, the analysis module 160 can identify that tag 212 is associated with every webpage 120, 220, 222, 224, 230, 240, 242 of the website 120. Additionally, the analysis module 160 can identify that tag 214 is associated with the home page of the website and with webpages 240 and 242. Further, the analysis module 160 can identify that the tag 216 is associated with webpages 220, 222, and 224. Further still, the analysis module can identify that tag 218 is only associated with webpage 242.

After the analysis module 160 identifies the tags 212, 214, 216, 218 that are associated with each webpage 120, 220, 222, 224, 230, 240, 242, the rule creation module 170 can generate rules for a tag a management system. In at least one implementation, the rule creation module 170 can create a set of rules that defines the characteristics and associations of the tag 212, 214, 216, 218 on a page-by-page basis. For example, the rule creation module 170 can create the following rule for webpage 120: "http://www.mywebsite.com includes tag 212, tag 214." Similarly, the rule creation module 170 can create the following rule for webpage 220: "http://www.mywebsite.com/A includes tag 212, tag 216." This practice can be continued until every individual page of a website has an individual rule.

In contrast, in at least one implementation, the rule creation module 170 can create rules based upon patterns that are identified by the analysis module 160. For example, the analysis module 170 can identify that tag 212 is present on every webpage 120, 220, 222, 224, 230, 240, 242 of the website 120. In this situation, the rule creation module 170 can generate the following rule: "http://www.mywebsite.com propagates tag 212." This rule would direct a tag management system to include tag 212 on webpage 120 and every webpage 220, 222, 224, 230, 240, 242 that is lower in hierarchy to webpage 120.

Similarly, the analysis module 160 can identify that tag 216 is present on website 220 and 222. In at least one implementation, the rule creation module 170 can create the following rule: "http://www.mywebsite.com/A propagates tag 216." One will notice, however, that webpage 224 is lower in hierarchy than webpage 220, but webpage 224 does not include tag 216. To prevent tag 216 from incorrectly propagating to webpage 224, the rule creation module can create the following rule: "http://www.mywebsite.com/A/1/a blocks tag 216." This rule can prevent tag 216 from being associated with webpage 224. Additionally, in at least one implementation, this rule can prevent tag 216 from propagating past webpage 224.

One will understand that the analysis module 160 can rely upon logic instructions to determine under what circumstances a rule should be propagated, blocked, or individually included. Additionally, one will understand that the rules that are generated by the rule creation module 170 can be influenced by the output format that is desired. For example, some output formats may not allow for rules that propagate tags. Similarly, one will understand that the above provided exemplary rules are merely illustrative, and that the actual rules may take another form.

Figure 3:
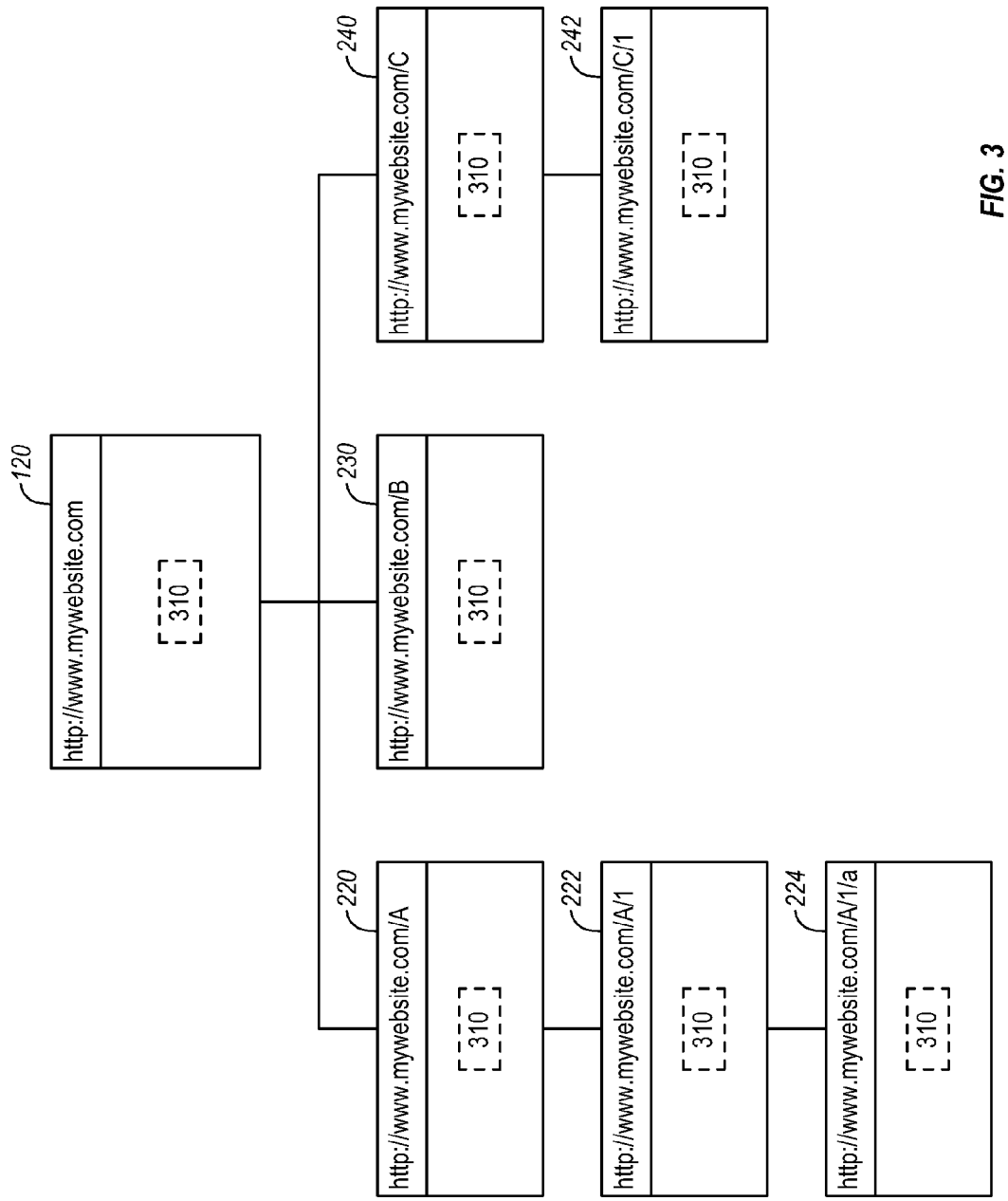
FIG. 3 illustrates another depiction of a website with multiple webpages containing tags and the relationship thereof.

FIG. 3 illustrates a depiction of the website of FIG. 2 after a tag management system has been implemented. The webpages 120, 220, 222, 224, 230, 240, 242 no longer comprise a plurality of tags, but instead comprise a single master tag 310 associated with each of the webpages 120, 220, 222, 224, 230, 240, 242. A tag management system can use the master tag 310 and the rules generated by the rule creation module 170 to reproduce the appropriate tags 212, 214, 216, 218 on each specific webpage 120, 220, 222, 224, 230, 240, 242.

For example, when a user accesses webpage 220 the tag management system can access the previously recited exemplary rules that were created by the rule creation module 170. Specifically, in at least one implementation, rule "http://www.mywebsite.com/A includes tag 212, tag 216" instructs the tag management system to fire tags 212 and 216 on webpage 220. One will understand that reducing the plurality and diversity of tags 212, 214, 216, 218 that were depicted in FIG. 2 to a single common master tag 310 shown in FIG. 3 can provide significant efficiency requirements.

Further, in at least one implementation, the system depicted in FIG. 3 can allow a user to use a single interface (i.e., the tag management system) to manage all of the tags for the entire website 120. For example, a website administrator can use the tag management system to block an insecure or out-of-date tag from running without having to manually remove the tag from every individual webpage 120, 220, 222, 224, 230, 240, 242.

Accordingly, FIGS. 1-3 and the corresponding text illustrate or otherwise describe one or more components, modules, and/or mechanisms for automatically creating rules for a tag management system. In particular, in at least one implementation, the present invention can analyze a website and generate a set of rules that enable a tag management system to replicate the tag configuration of the webpage. One will appreciate that implementations of the present invention can also be described in terms of flowcharts comprising one or more acts for accomplishing a particular result. For example, FIGS. 4 and 5 and the corresponding text describe acts in a method for creating rules for tag management system. The acts of FIGS. 4 and 5 are described below.

Figure 4:
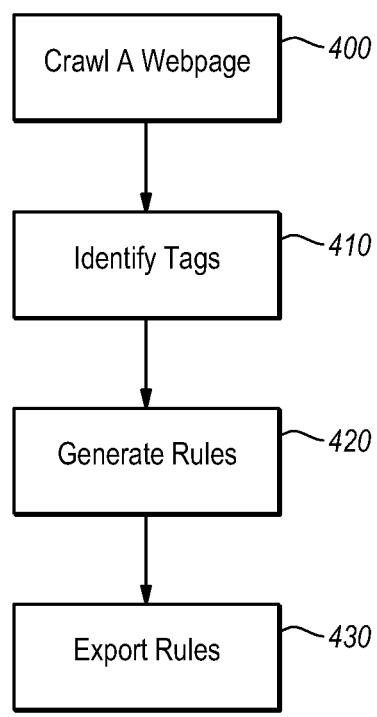
FIG. 4 illustrates a flow chart of a series of acts in a method in accordance with an implementation of the present invention for creating rules for a tag management system.
Figure 5:
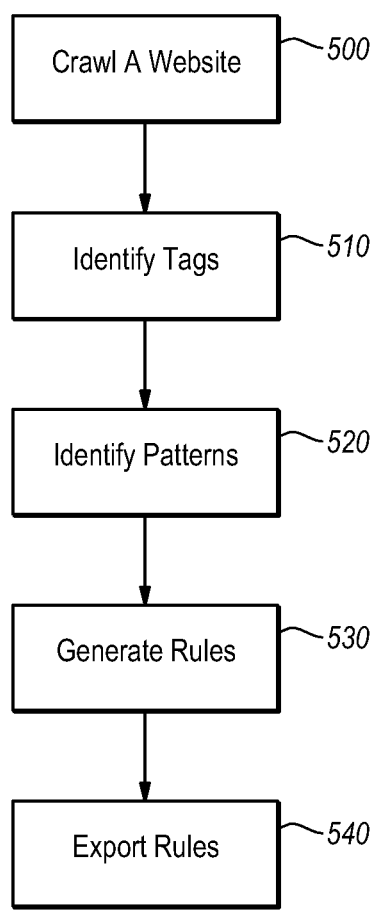
FIG. 5 illustrates another flow chart of a series of acts in a method in accordance with an implementation of the present invention for creating rules for a tag management system.

For example, FIG. 4 illustrates that a method for creating rules for a tag management system can include an act 400 of crawling a webpage 120, 220, 222, 224, 230, 240, 242. Act 400 includes crawling a page of a website 120. For example, FIG. 2 shows a webpage 120 that the site crawling module 140 can crawl.

FIG. 4 also shows that the method can comprise act 410 of identifying tags 212, 214, 216, 218. Act 410 includes identifying the configuration of each of the tags implemented within the page. For example, FIG. 1, and the accompanying description, recite a method of using an analysis module 160 to identify the identity and configuration of tags 212, 214, 216, 218.

In addition, FIG. 4 shows that the method can comprise act 420 of generating rules. Specifically, act 420 can include generating one or more rules that enable a tag management system to recreate the configuration of one or more tags 212, 214, 216, 218 implemented within the page. For example, FIG. 2, and the accompanying description, recite a method for generating rules that can enable a tag management system to recreate the tag configuration of the website depicted in FIG. 2.

Further, FIG. 4 shows that the method can comprise act 430 of exporting rules. Act 430 can include exporting the generated one or more rules to the tag management system. For example, FIG. 3, and the accompanying description, describe a method for exporting rules to a tag management.

Additionally, FIG. 5 illustrates that a method for creating rules for a tag management system can include an act 500 of crawling a website 120. Act 500 includes crawling each of the webpages 120, 220, 222, 224, 230, 240, 242 of a website 120. For example, FIG. 2 shows a website 120 that the site crawling module 140 can crawl.

FIG. 5 also shows that the method can comprise act 510 of identifying tags 212, 214, 216, 218. Act 510 includes identifying the identifying one or more tags implemented within each of the pages. For example, FIG. 1, and the accompanying description, recite a method of using an analysis module 160 to identify the identity and configuration of tags 212, 214, 216, 218.

In addition, FIG. 5 shows that the method can comprise act 520 of identifying patterns. Specifically, act 520 includes identifying one or more patterns of the tags 212, 214, 216, 218 implemented within the webpages 120, 220, 222, 224, 230, 240, 242 of the website 120. For example, FIG. 2, and the accompanying description, describe a method of identifying patterns within the tags 212, 214, 216, 218 that are associated with the various webpages 120, 220, 222, 224, 230, 240, 242 of a website 120.

Further, FIG. 5 shows that the method can comprise act 530 of generating rules. Specifically, act 530 can include generating one or more rules that are configured to enable a tag management system to recreate the one or more identified patterns. For example, FIGS. 2 and 3, and the accompanying description, recite a method for generating rules that can enable a tag management system to recreate the one or more identified patterns.

Further still, FIG. 5 shows that the method can comprise act 540 of exporting rules. Act 540 can include exporting the generated one or more rules to the tag management system. For example, FIG. 3, and the accompanying description, describe a method for exporting rules to a tag management.

Accordingly, FIGS. 1-5 provide a number of components, schematics, and mechanisms for automatically creating rules for a tag management system. Additionally, one or more implementations can automatically analyze a website and generate rules that can allow a tag management system to replicate the tag configuration of the webpage. Further, the present invention can identify undesirable tags that are currently implemented within a website. One will appreciate that the components and mechanisms described herein can greatly simplify the creation of rules for a tag management system. For example, the components and mechanisms described herein create tag rules for a tag management system without requiring that each individual webpage be manually analyzed.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an online webpage in which webpage content is loaded into memory and processed at a central processing unit, a computer-implemented method for creating rules for a tag management system, the method comprising
receiving a universal resource locator (URL) that is associated with a target website;
accessing through a network connection the target website, wherein accessing the target website comprises downloading source code that describes one or more webpages within the target website;
rendering at least a portion of the source code, wherein rendering at least the portion of the source code includes rendering multimedia content referenced within the source code;
identifying, with a computer processor, one or more tags associated with a webpage, wherein the association of the one or more tags with the webpage is identified by:
comparing the source code of the webpage and behaviors of the rendered portion of the source code to signatures within a tag signature database;
based upon information within the tag signature database and detected behaviors of each of the one or more tags, identifying the configuration of each of the one or more tags implemented within the webpage;
generating, with a rule creation module, one or more rules for the webpage that enable a tag management system to recreate the identified configuration of the one or more tags implemented within the webpage; and
exporting the generated one or more rules to the tag management system.

2. The method as recited in claim 1, further comprising:
identifying one or more tag patterns across a plurality of pages within a website; and
generating one or more rules that enable a tag management system to recreate the one or more identified tag patterns.

3. The method as recited in claim 1, further comprising:
determining, with the computer processor, that insufficient information is available to fully characterize a particular tag;
based upon the identified configuration of the particular tag, creating an incomplete rule that describes the particular tag, wherein the incomplete rule does not fully characterize the particular tag; and
generating a user information request, wherein the user information request prompts a user to provide additional information to fully characterize the particular tag.

4. The method as recited in claim 1, further comprising:
identifying that the configuration of at least one tag implemented within the page includes at least one variable.

5. The method as recited in claim 4, further comprising:
determining potential values for the at least one variable; and
generating one or more rules that enable the tag management system to recreate the configuration of the at least one tag implemented within the page.

6. The method as recited in claim 4, further comprising:
notifying a user of the identified at least one tag and the identified at least one variable; and
receiving, from a user, input relating to at least a portion of the one or more rules that enable the tag management system to recreate the configuration of the at least one tag implemented within the page.

7. The method as recited in claim 1, further comprising:
rendering the page of the website; and
identifying the configuration of each tag on the page as the page is rendered.

8. The method of claim 7, further comprising:
executing a multimedia file that is embedded within the page of the website; and
identifying at least one tag that is associated with the multimedia file.

9. The method as recited in claim 1, further comprising:
identifying at least one tag that is adapted to execute a specific code portion only on a first page of a particular session; and
generating one or more rules that enable a tag management system to recreate the configuration of the at least one tag.

10. The method as recited in claim 1, further comprising:
receiving from a user an indication of a specific format in which to export the generated one or more rules to the tag management system.

11. In an online webpage in which webpage content is loaded into memory and processed at a central processing unit, a computer-implemented method for creating rules for a tag management system, the method comprising:

crawling each one or more pages of a website;
identifying one or more tags implemented within each of the one or more pages by comparing source code associated with each of the one or more tags to a database of tag signatures;
identifying, with the central processing unit, one or more patterns of the one or more tags implemented within the one or more pages of the website, wherein the one or more patterns comprise common tags and common tag configurations appearing across hierarchically related webpages;
generating, with a rule creation module, one or more rules that are configured to enable a tag management system to recreate the one or more identified patterns, wherein the one or more rules describe the common tags and common tag configurations appearing across the hierarchically related webpages; and
exporting the generated one or more rules.

12. The method as recited in claim 11, further comprising:
accessing the database of tag signatures; and
identifying a configuration of each of the tags implemented within the page using information stored within the database of tag signatures.

13. The method as recited in claim 11, further comprising:
identifying that the configuration of at least one tag implemented within a page of the website includes at least one variable.

14. The method as recited in claim 13, further comprising:
determining potential values for the at least one variable; and
generating one or more rules that enable the tag management system to recreate the configuration of the at least one tag implemented within the page.

15. The method as recited in claim 14, further comprising:
notifying a user of the identified at least one tag and the identified at least one variable; and
receiving, from a user, input relating to at least a portion of the one or more rules that enable the tag management system to recreate the configuration of the at least one tag implemented within the page.

16. The method as recited in claim 11, further comprising:
rendering the page of the website; and
identifying the configuration of each tag on the page as the page is rendered.

17. The method as recited in claim 16, further comprising:
executing a multimedia file that is embedded within the page of the website; and
identifying at least one tag that is associated with the multimedia file.

18. The method as recited in claim 11, further comprising:
identifying at least one tag that is adapted to execute a specific code portion only on a first page of a particular session; and
generating one or more rules that enable a tag management system to recreate the configuration of the at least one tag.

19. The method as recited in claim 11, further comprising:
receiving from a user an indication of a specific format in which to export the generated one or more rules to the tag management system.

20. A computer program product for use at a computer system, the computer program product for implementing a method for creating rules for a tag management system, the computer program product comprising one or more computer storage media having stored thereon computer-executable instructions that, when executed at a processor, cause the computer system to perform the method, including the following:
crawling a webpage of a website;
based upon information within a database of tag signatures and detected behaviors of each of one or more tags, identifying the configuration of each of the tags implemented within the page;
generating, with a rule creation module, one or more rules for the webpage that enable a tag management system to recreate the identified configuration of the one or more tags implemented within the crawled webpage, wherein the one or more rules are based at least in part upon the information within the database of tag signatures; and
exporting the generated one or more rules to the tag management system.

21. A computer system for creating rules for a tag management system, comprising
one or more processors; and
one or more computer-readable media having stored thereon executable instructions that when executed by the one or more processors configure the computer system to perform at least the following:
receive a universal resource locator (URL) that is associated with a target website;
access through a network connection the target website, wherein accessing the target website comprises downloading source code that describes one or more webpages within the target website;
render at least a portion of the source code, wherein rendering at least the portion of the source code includes rendering multimedia content referenced within the source code;
identify, with a computer processor, one or more tags associated with a webpage, wherein the association of the one or more tags with the webpage is identified by:
comparing the source code of the webpage and behaviors of the rendered portion of the source code to signatures within a tag signature database;
based upon information within the tag signature database and detected behaviors of each of the one or more tags, identify the configuration of each of the one or more tags implemented within the webpage;
generate, with a rule creation module, one or more rules for the webpage that enable a tag management system to recreate the identified configuration of the one or more tags implemented within the webpage; and
export the generated one or more rules to the tag management system.

22. The method as recited in claim 1, wherein the behaviors of the rendered portion of the source code includes resulting network requests.

23. The system as recited in claim 21, wherein the behaviors of the rendered portion of the source code includes resulting network requests.

* * * * *